(12) United States Patent
Fujita et al.

(10) Patent No.: US 9,109,513 B2
(45) Date of Patent: Aug. 18, 2015

(54) COMBINED CYCLE ELECTRIC POWER GENERATION PLANT AND HEAT EXCHANGER

(75) Inventors: Issaku Fujita, Takasago (JP); Toru Osone, Takasago (JP); Kazuki Hayashi, Takasago (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 925 days.

(21) Appl. No.: 12/866,412

(22) PCT Filed: Oct. 1, 2008

(86) PCT No.: PCT/JP2008/067817
§ 371 (c)(1),
(2), (4) Date: Sep. 10, 2010

(87) PCT Pub. No.: WO2010/038288
PCT Pub. Date: Apr. 8, 2010

(65) Prior Publication Data
US 2011/0173948 A1 Jul. 21, 2011

(51) Int. Cl.
*F02C 6/18* (2006.01)
*F02C 7/10* (2006.01)
(Continued)

(52) U.S. Cl.
CPC ...... *F02C 6/18* (2013.01); *F02C 7/10* (2013.01); *F02C 7/141* (2013.01); *F02C 7/143* (2013.01); *Y02E 20/16* (2013.01)

(58) Field of Classification Search
CPC .............. F02C 1/06; F02C 6/08; F02C 6/18; F02C 7/08; F02C 7/10; F02C 7/14; F02C 7/141; F02C 7/16; F02C 7/224; F05D 2220/72; F05D 2220/722; F05D 2260/213; F01K 23/10; F28D 1/04; F28D 1/0417; F28D 1/0408

USPC ............. 60/805, 806, 39.182, 736, 728, 266, 60/267; 165/140, 157, 166, 47, 51, 52, 165/163

See application file for complete search history.

(56) References Cited

U.S. PATENT DOCUMENTS 3,534,812 A * 10/1970 Sandri ........................... 165/140
5,255,505 A * 10/1993 Cloyd et al. .................... 60/806
(Continued)

FOREIGN PATENT DOCUMENTS

JP        S62-067239      3/1987
JP        H05-018265      1/1993
(Continued)

*Primary Examiner* — Devon Kramer
*Assistant Examiner* — Vikansha Dwivedi
(74) *Attorney, Agent, or Firm* — Manabu Kanesaka; Benjamin Hauptman; Kenneth Berner

(57) ABSTRACT

A loss of heat that can be recovered in a heat recovery steam generator is eliminated, whereby a combined cycle electric power generation plant with high heat recovery efficiency is provided. A combined cycle electric power generation plant is adopted that includes a heat recovery steam generator 30 that generates steam for driving a steam turbine 20 using heat of exhaust gas of a gas turbine 10, a cooling air cooler 71 that causes high-pressure feed water supplied from a low-pressure economizer 37 of the heat recovery steam generator 30 and compressed air for turbine cooling extracted from a compressor 11 of the gas turbine 10 to perform heat exchange to heat the high-pressure feed water to thereby cool the compressed air, and a fuel gas heater 72 that causes the compressed air cooled in the cooling air cooler 71 and a fuel gas of the gas turbine 10 to perform heat exchange to further cool the compressed air to thereby heat the fuel gas.

7 Claims, 6 Drawing Sheets

(51) Int. Cl.
*F02C 7/141* (2006.01)
*F02C 7/143* (2006.01)

(56) References Cited

U.S. PATENT DOCUMENTS 5,797,259 A 8/1998 Nielsen et al.
6,018,942 A * 2/2000 Liebig ........................ 60/39.182
6,560,966 B1 * 5/2003 Fetescu et al. .................. 60/775

FOREIGN PATENT DOCUMENTS

| | | |
|---|---|---|
| JP | H09-177566 | 7/1997 |
| JP | H10-169414 | 6/1998 |
| JP | 2003-343283 | 12/2003 |
| JP | 2008-255822 | 10/2008 |

* cited by examiner

COMBINED CYCLE ELECTRIC POWER GENERATION PLANT AND HEAT EXCHANGER

RELATED APPLICATIONS

The present application is National Phase of International Application No. PCT/JP2008/067817 filed Oct. 1, 2008, the disclosure of which is hereby incorporated by reference herein in its entirety.

TECHNICAL FIELD

The present invention relates to a combined cycle electric power generation plant employing an exhaust heat recovery system and a heat exchanger included in the plant.

BACKGROUND ART

As a power generation system for a combined cycle electric power generation plant, a so-called exhaust heat recovery system for leading exhaust gas after work in a gas turbine to a heat recovery steam generator (H.R.S.G.), generating steam using the exhaust heat, and driving a steam turbine using the steam is generally used.

In a combined cycle electric power generation plant of such an exhaust heat recovery system, efforts for refinement and improvement are always performed for improvement of efficiency and stability of operation.

For example, in a gas turbine, in order to realize improvement of efficiency by raising of combustion temperature, the temperature of a fuel gas is raised. Specifically, a fuel gas heater for heating the fuel gas of the gas turbine is provided. The fuel gas heater heats the fuel gas with intermediate-pressure feed water supplied to the heat recovery steam generator. The heated fuel gas is supplied to a combustor of the gas turbine and consumed (see Patent Document 1 described below).

As an example of heat balance in the fuel gas heater, as shown in FIG. 7, the temperature of a fuel gas supplied to a fuel gas heater 172 is 6.8° C. and the temperature of intermediate-pressure feed water supplied from an intermediate-pressure economizer 139 to the fuel gas heater 172 is 255° C. The temperature of a fuel gas discharged from the fuel gas heater 172 after heat exchange and supplied to a combustor 112 of a gas turbine 100 is 210° C. and the temperature of intermediate-pressure feed water also discharged from the fuel gas heater 172 after heat exchange and supplied to a pre-heater 137 is 65° C.

In order to prevent overheating of the turbine and realize stable operation of the gas turbine, moving blades and stationary blades of the turbine are cooled. For this cooling, compressed air extracted from a compressor of the gas turbine is used. Since the compressed air is heated by compression, a cooling air cooler for cooling this compressed air is provided. The cooling air cooler cools, with high-pressure feed water supplied to the heat recovery steam generator, the compressed air extracted from the compressor of the gas turbine. The cooled air is supplied to the moving blades and the stationary blades of the turbine and cools the moving blades and the stationary blades (see, for example, Patent Document 2 described below).

As an example of heat balance in the cooling air cooler, as shown in FIG. 7, the temperature of high-pressure feed water supplied from the pre-heater 137 to the conventional cooling air cooler 171 is 172° C. and the temperature of compressed air supplied from a compressor 111 of the gas turbine 100 to the cooling air cooler 171 is 456° C. The temperature of high-pressure feed water discharged from the cooling air cooler 171 after heat exchange and supplied to a high-pressure drum 134 is 326° C. and the temperature of compressed air also discharged from the cooling air cooler 171 after heat exchange and supplied for cooling of the turbine 113 is 200° C.

Patent Document 1: Japanese Patent Laid-Open No. 2003-343283
Patent Document 2: Japanese Patent Laid-Open No. H10-169414

DISCLOSURE OF THE INVENTION

Problems to be Solved by the Invention

Further improvement of efficiency is always requested for the conventional technique explained above. From such a viewpoint, there is still room for improvement in the conventional technique.

Specifically, in the conventional combined cycle electric power generation plant, the fuel gas heater uses the intermediate-pressure feed water for a heat source for heating the fuel gas and causes the fuel gas and the intermediate-pressure feed water to perform heat exchange to deprive heat from the intermediate-pressure feed water. Thereafter, the intermediate-pressure feed water is supplied to the high-pressure drum and vaporized by heat of exhaust gas. However, since the intermediate-pressure feed water is cooled in the fuel gas heater, a heat quantity of the intermediate-pressure feed water decreases. Therefore, in the heat recovery steam generator, since the intermediate-pressure feed water is vaporized after the exhaust gas supplements the intermediate-pressure feed water with the decreased heat quantity, the exhaust gas has to apply excess work to the intermediate-pressure feed water. In other words, in the conventional combined cycle electric power generation plant, a large heat quantity is necessary for evaporating the intermediate-pressure feed water in the high-pressure drum. Therefore, it can be said that there is room for improvement of heat energy that can be recovered in the heat recovery steam generator.

In the conventional combined cycle electric power generation plant, the cooling air cooler needs to deprive an extremely large heat quantity from high-temperature compressed air and perform cooling. Therefore, there is room in terms of effective use of heat energy. A heat transfer area of the cooling air cooler has to be increased in order to deprive a large heat quantity from the compressed air. As a result, there is also a problem in that the cooling air cooler is increased in size.

The present invention has been devised in view of the circumstances and it is an object of the present invention to provide a combined cycle electric power generation plant with high heat recovery efficiency and provide a heat exchanger included in the plant, small in size, and having high thermal efficiency.

Means for Solving the Problems

In order to solve the problems, a combined cycle electric power generation plant having a configuration explained below is adopted.

A combined cycle electric power generation plant according to the present invention is a combined cycle electric power generation plant including a heat recovery steam generator that generates steam for steam turbine driving using heat of exhaust gas of a gas turbine, the combined cycle electric power generation plant including: a first heat exchanger that causes high-pressure feed water supplied from an economizer of the heat recovery steam generator and compressed air for turbine cooling extracted from a compressor of the gas turbine to perform heat exchange to heat the high-pressure feed water to thereby cool the compressed air; and a second heat exchanger that causes the compressed air cooled in the first heat exchanger and a fuel gas of the gas turbine to perform heat exchange to further cool the compressed air to thereby heat the fuel gas.

In the combined cycle electric power generation plant, it is also possible to arrange a shroud in a casing that forms an outer shell, form an inner channel on the inner side of the shroud, form, between the casing and the shroud, an outer channel that communicates with the inner channel on one end side of the shroud, arrange the first heat exchanger on the inner channel, and arrange the second heat exchanger on the inner channel further on a downstream side than the first heat exchanger. In this case, the compressed air for turbine cooling flows into the inner channel from the other end side of the shroud and, after sequentially passing through the first heat exchanger and the second heat exchanger, reverses the direction of the flow on one end side of the shroud and flows into the outer channel, and is discharged to the outside of the casing from the outer channel.

The present invention can be a heat exchanger included in a heat recovery steam generator that generates steam for steam turbine driving using heat of exhaust gas of a gas turbine. This heat exchanger includes: a first heat transfer unit that causes high-pressure feed water supplied from an economizer of the heat recovery steam generator and compressed air for turbine cooling of the gas turbine to perform heat exchange to heat the high-pressure feed water to thereby cool the compressed air; and a second heat transfer unit that causes the compressed air cooled in the first heat transfer unit and a fuel gas of the gas turbine to perform heat exchange to further cool the compressed air to thereby heat the fuel gas.

In such a heat exchanger, it is also possible to include a casing that forms an outer shell of the heat exchanger and a shroud arranged in the casing, form an inner channel on the inner side of the shroud, and form, between the casing and the shroud, an outer channel that communicates with the inner channel on one end side of the shroud. The first heat transfer unit is arranged on the inner channel and the second heat transfer unit is arranged on the inner channel further on a downstream side than the first heat transfer unit. In the heat exchanger having such a configuration, the compressed air for turbine cooling flows into the inner channel from the other end side of the shroud and, after sequentially passing through the first heat exchanger and the second heat exchanger, reverses the direction of the flow on one end side of the shroud and flows into the outer channel, and is discharged to the outside of the casing from the outer channel.

Advantages of the Invention

With the combined cycle electric power generation plant according to the present invention, since the cooling of the compressed air for turbine cooling is performed by a feed water heater (the first heat exchanger of the present invention) and a fuel gas heater (the second heat exchanger of the present invention) of the heat recovery steam generator, a heat loss is small. Therefore, thermal efficiency of the plant is improved.

With the heat exchanger according to the present invention, since an average temperature difference between the heat exchangers can be set larger, heat transfer areas of the heat exchangers are reduced. The heat exchanger can be reduced in size.

DESCRIPTION OF SYMBOLS

Figure 1:
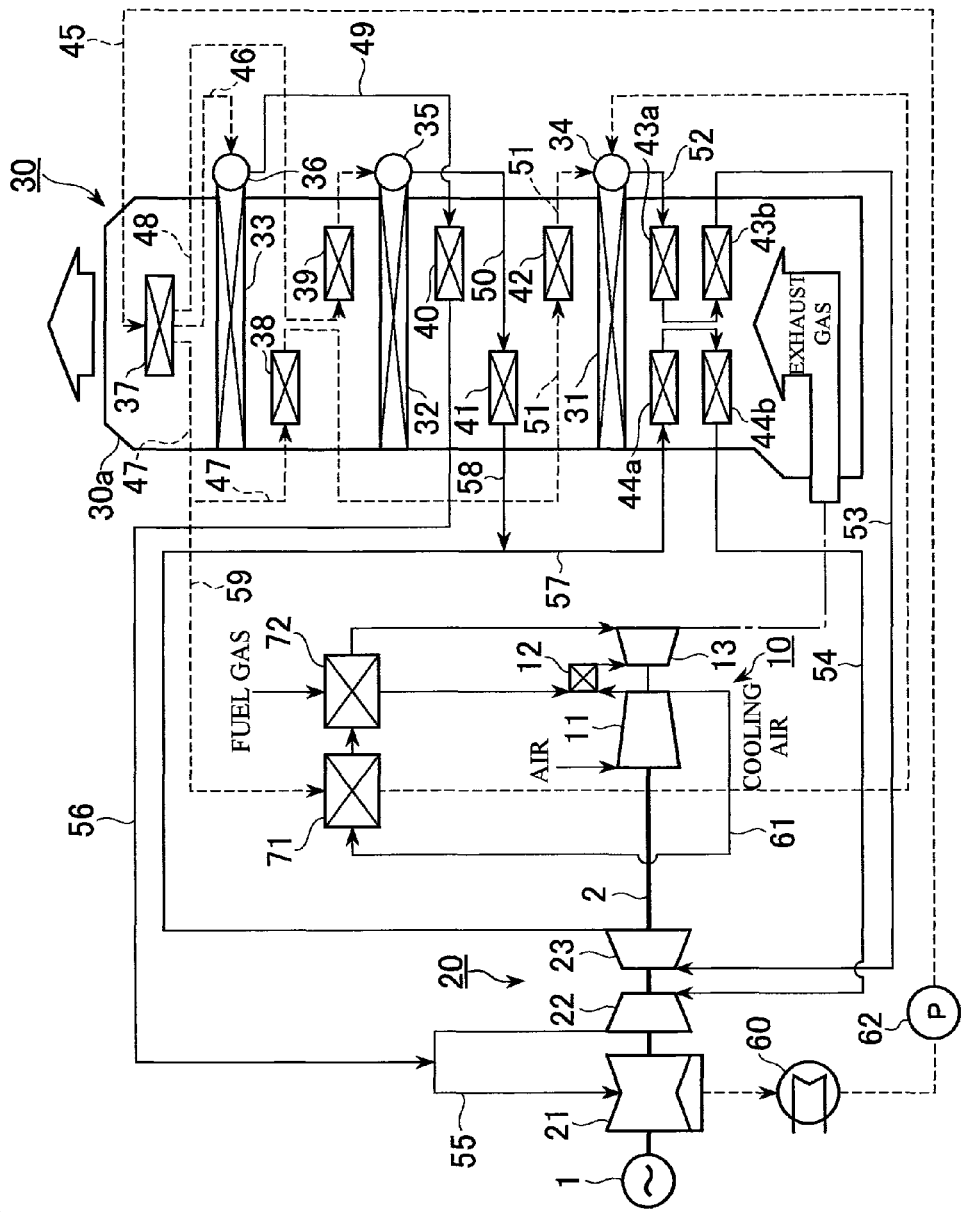
FIG. 1 is a diagram showing an embodiment of the present invention and a schematic diagram showing a combined cycle electric power generation plant of a single shaft type employing an exhaust heat recovery system.
Figure 2:
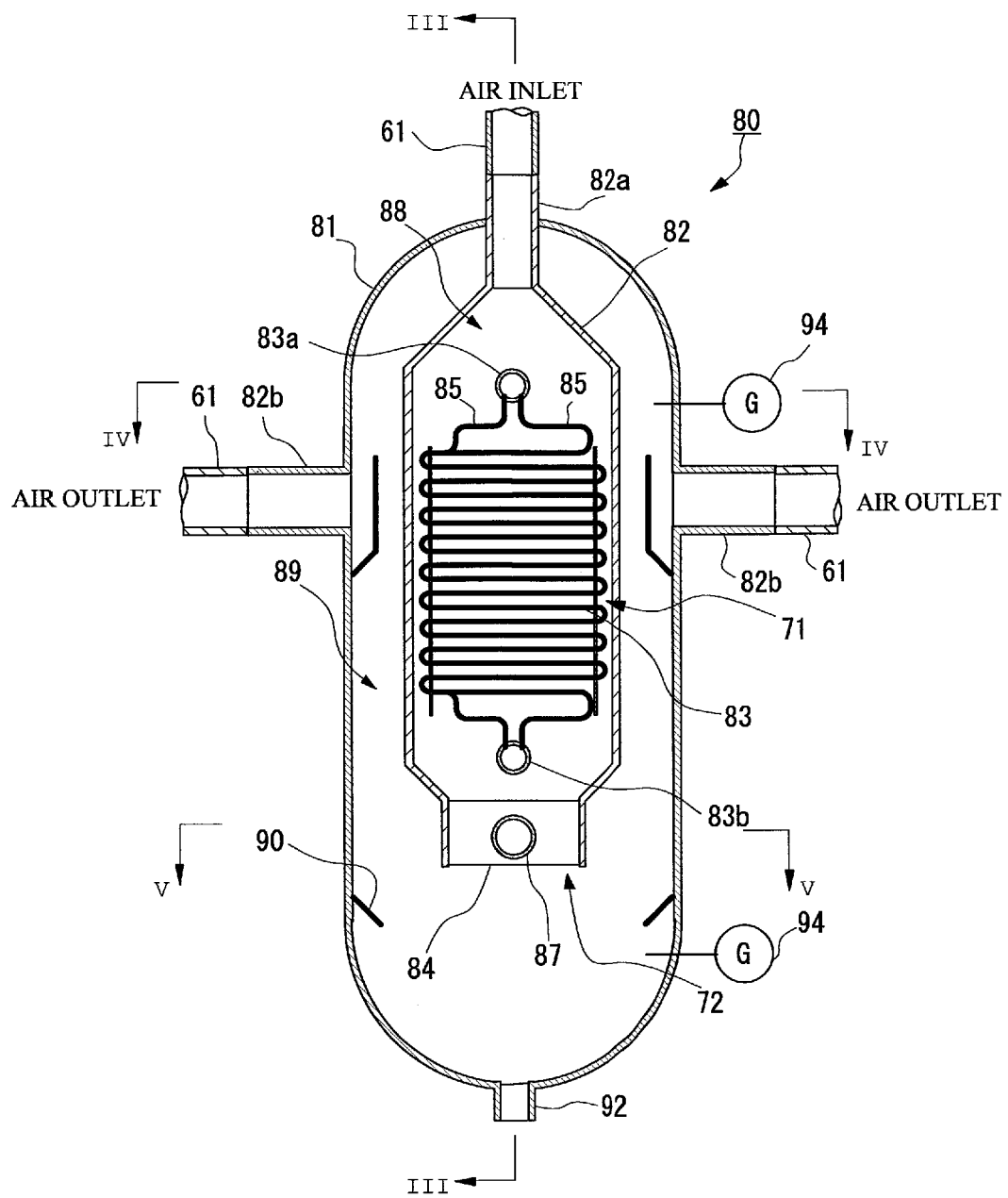
FIG. 2 is a diagram showing an embodiment of the present invention and a schematic diagram showing the internal structure of an integral heat exchanger included in the combined cycle electric power generation plant.
Figure 3:
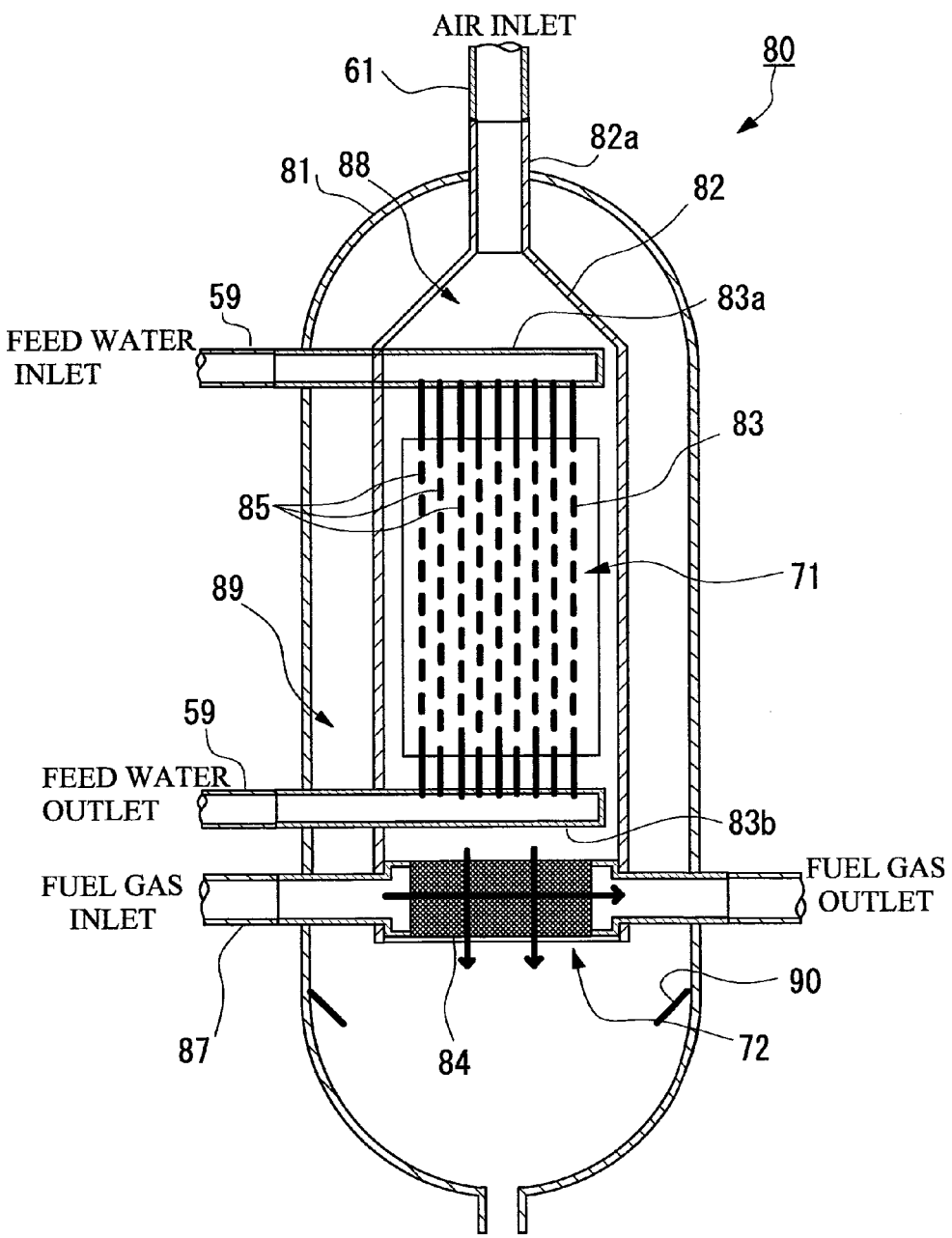
FIG. 3 is a longitudinal sectional view of the integral heat exchanger taken along line in FIG. 2.
Figure 4:
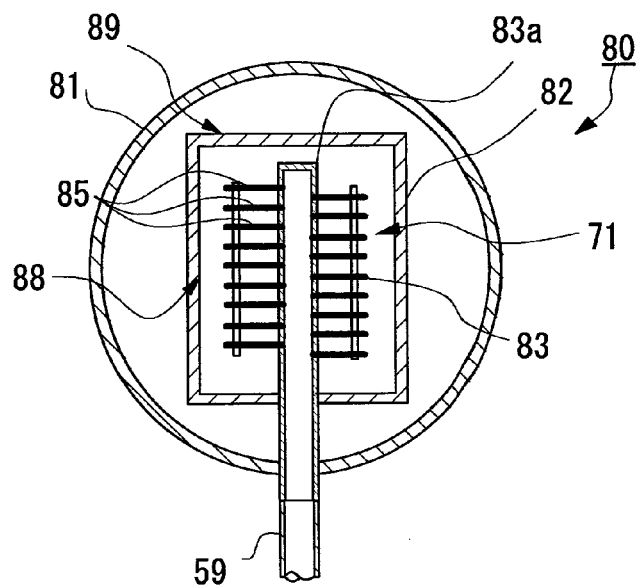
FIG. 4 is a cross sectional view of the integral heat exchanger taken along IV-IV line in FIG. 2.
Figure 5:
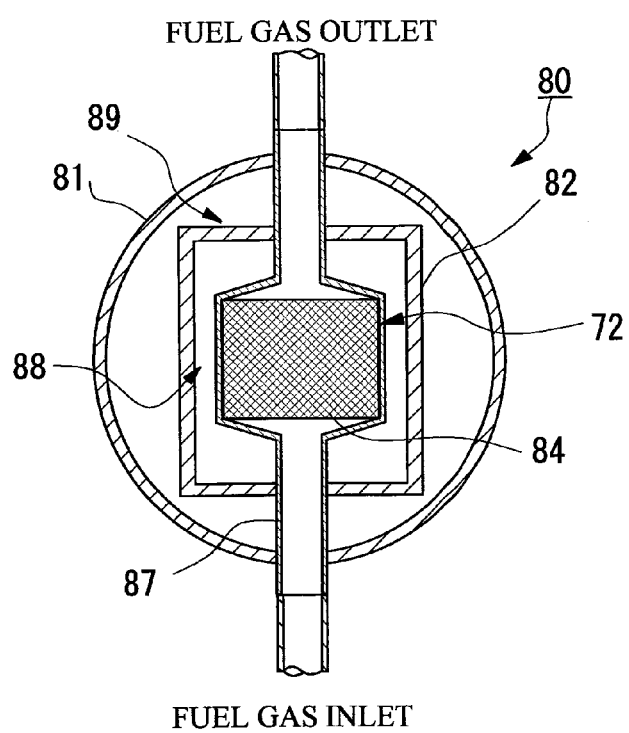
FIG. 5 is a cross sectional view of the integral heat exchanger taken along V-V line in FIG. 2.

1 . . . generator
2 . . . main shaft
10 . . . gas turbine
11 . . . compressor
12 . . . combustor
13 . . . turbine
20 . . . steam turbine
30 . . . heat recovery steam generator
60 . . . condenser
71 . . . cooling air cooler (first heat exchanger, first heat transfer unit)
72 . . . fuel gas heater (second heat exchanger, second heat transfer unit)
80 . . . integral heat exchanger
83 . . . heat transfer pipe bundle
84 . . . plate fins
87 . . . fuel gas pipe

BEST MODE FOR CARRYING OUT THE INVENTION

An embodiment of a combined cycle electric power generation plant according to the present invention is explained with reference to FIG. 1.

In FIG. 1, a combined cycle electric power generation plant of a single shaft type employing an exhaust heat recovery system is shown. As shown in the figure, this combined cycle electric power generation plant includes, as main components, a generator 1, a gas turbine 10, a steam turbine 20, a heat recovery steam generator 30, a condenser 60, and a condensing pump 62.

The gas turbine 10 includes a compressor 11, a combustor 12, and a turbine 13. The steam turbine 20 includes low-pressure, intermediate-pressure, and high-pressure three turbines 21, 22, and 23. The gas turbine 10 shares, with the steam turbine 20, a main shaft 2 connected to the generator 1. The gas turbine 10 extracts, as a rotating force of the main shaft 2, work applied to the turbine 13 by a combustion gas. The steam turbine 20 extracts, as rotating force of the main shaft 2, work applied to the turbines 21, 22, and 23 by steam to thereby drive the compressor 11 and the generator 1.

In the heat recovery steam generator 30, in the inside of a housing 30a that forms a channel of exhaust gas generated in the gas turbine 10, high-pressure, intermediate-pressure, and low-pressure three evaporators 31, 32, and 33 are arranged in order along a direction in which the exhaust gas flows. In the evaporators 31, 32, and 33, high-pressure, intermediate-pressure, and low-pressure three drums 34, 35, and 36 are respectively annexed.

A low-pressure economizer 37 that heats, with heat of the exhaust gas, water supplied from the condenser 60 via a water supply channel 45 is provided on an exhaust gas channel further on a downstream side than the low-pressure evaporator 33. The low-pressure feed water heated by the low-pressure economizer 37 is supplied to the low-pressure drum 36 via a water supply channel 46. In an exhaust gas channel between the low-pressure evaporator 33 and the intermediate-pressure evaporator 32, a primary high-pressure economizer 38 that heats, with the heat of the exhaust gas, the high-pressure feed water supplied from the low-pressure economizer 37 via a water supply channel 47 and an intermediate-pressure economizer 39 that heats, with the heat of the exhaust gas, the intermediate-pressure feed water supplied from the low-pressure economizer 37 via a water supply channel 48 are provided. The intermediate-pressure feed water heated in the intermediate-pressure economizer 39 is supplied to the intermediate-pressure drum 35 via the water supply channel 48.

On an exhaust gas channel between the high-pressure evaporator 31 and the intermediate-pressure evaporator 32, a low-pressure superheater 40 that overheats, with the heat of the exhaust gas, low-pressure steam supplied from the low-pressure drum 36 via a steam channel 49, an intermediate-pressure superheater 41 that overheats, with the heat of the exhaust gas, intermediate-pressure steam supplied from the intermediate-pressure drum 35 via a steam channel 50, and a secondary high-pressure economizer 42 that heats, with the heat of the exhaust gas, high-pressure feed water supplied from the primary high-pressure economizer 38 via a water supply channel 51 are provided. The high-pressure feed water heated in the secondary high-pressure economizer 42 is supplied to the high-pressure drum 34 via the water supply channel 51.

On an exhaust gas channel further on an upstream side than the high-pressure evaporator 31, primary and secondary two high-pressure superheaters 43a and 43b that overheat, with the heat of the exhaust gas, high-pressure steam supplied from the high-pressure drum 34 via a steam channel 52 and primary and secondary two reheaters 44a and 44b that reheat, with the heat of the exhaust gas, steam that has applied work to the high-pressure turbine 23 are set.

The secondary high-pressure superheater 43b is connected to the high-pressure turbine 23 via a steam channel 53. The secondary reheater 44b is connected to the intermediate-pressure turbine 22 via a steam channel 54. The intermediate-pressure turbine 22 is connected to the low-pressure turbine 21 via a steam channel 55. The low-pressure superheater 40 is connected to the low-pressure turbine 21 via steam channels 56 and 55.

The high-pressure turbine 23 is connected to the primary reheater 44a via a steam channel 57 and the intermediate-pressure superheater 41 is connected to the primary reheater 44a via steam channels 58 and 57.

Further, this combined cycle electric power generation plant includes a cooling air cooler (a first heat exchanger) 71 that cools compressed air for turbine cooling and a fuel gas heater (a second heat exchanger) 72 that heats a fuel gas of the gas turbine 10. The cooling air cooler 71 and the fuel gas heater 72 are connected in series along a supply path for the compressed air. The cooling air cooler 71 and the fuel gas heater 72 are integrated.

The cooling air cooler 71 causes high-pressure feed water supplied from the low-pressure economizer 37 to the high-pressure drum 34 via a water supply channel 59 and compressed air extracted from the compressor 11 of the gas turbine 10 via an air channel 61 to perform heat exchange to heat the high-pressure feed water and cool the compressed air. For the cooling air cooler 71, for example, a heat exchanger of a shell and tube type is adopted.

The fuel gas heater 72 causes the compressed air cooled by the cooling air cooler 71 and the fuel gas to perform heat exchange to further cool the compressed air and heat the fuel gas. The compressed air further cooled in the fuel gas heater 72 is supplied to moving blades and stationary blades of the turbine 13. The heated fuel gas is supplied to the combustor 12.

In FIG. 2 to FIG. 5, the structure of an integral heat exchanger 80 having a configuration in which the cooling air cooler 71 and the fuel gas heater 72 are integrated is shown. As shown in the figures, this integral heat exchanger 80 includes a casing 81 that forms an outer shell of the heat exchanger, a shroud 82 arranged in the inside of the casing 81, a heat transfer pipe bundle 83 arranged in the inside of the shroud 82, and plural plate fins 84 arranged in the inside of the shroud 82 and below the heat transfer pipe bundle 83. An inner channel 88 is formed in the inside of the shroud 82. An outer channel 89 that communicates with the inner channel 88 on a lower end side of the shroud 82 is formed between the casing 81 and the shroud 82. The heat transfer pipe bundle 83 is an element included in the cooling air cooler 71 (i.e., the first heat transfer unit) and is arranged on the inner channel 88 of the shroud 82. The plate fins 84 are elements included in the fuel gas heater 72 (i.e., the second heat transfer unit) and are arranged on the inner channel 88 on the downstream side of the heat transfer pipe bundle 83 to not prevent a flow of the compressed air.

One end of an air supply duct 82a for leading the compressed air extracted from the compressor 11 of the gas turbine 10 via the air channel 61 into the inside of the shroud 82 is connected to the shroud 82. The other end of the air supply duct 82a projects to the outside of the casing 81 and is connected to the air channel 61 on the upstream side. One end of an exhaust duct 82b for discharging the compressed air flowing out from the lower end of the shroud 82 to the outside is connected to the casing 81. The exhaust duct 82b is located above the lower end of the shroud 82. The other end of this exhaust duct 82b is connected to the air channel 61 on the downstream side.

A water supply header 83a and a drain header 83b are respectively provided above and below the heat transfer pipe bundle 83.

Upper ends of the plural heat transfer pipes 85, to which the high-pressure feed water supplied from the low-pressure economizer 37 via the water supply channel 59 is supplied, are connected to the water supply header 83a. The water supply header 83a projects to the outside of the casing 81 piercing through the shroud 82 and is connected to the water supply channel 59 on the upstream side.

Lower ends of the plural heat transfer pipes 85 are connected to the drain header 83b. The high-pressure feed water served for heat exchange is collected. The drain header 83b projects to the outside of the casing 81 piercing through the shroud 82 and is connected to the water supply channel 59 on the downstream side.

The heat transfer pipes 85 connected to the water supply header 83a and the drain header 83b are provided to be bent in, for example, a zigzag shape between the water supply header 83a and the drain header 83b and sends the high-pressure feed water from the water supply header 83a to the drain header 83b.

In such a heat transfer pipe bundle 83, the high-pressure feed water supplied from the low-pressure economizer 37 via the water supply channel 59 flows from the water supply header 83a to the drain header 83b through the heat transfer pipes 85. The compressed air sent into the inner channel 88 from the upper end side of the shroud 82 through the air supply duct 82a passes through gaps among the heat transfer pipes 85 included in the heat transfer pipe bundle 83 and, at this point, performs heat exchange with the surfaces of the heat transfer pipes 85. Consequently, the high-pressure feed water is heated and the compressed air is cooled. For the heat transfer pipe bundle 83, a pipe with fins, a pipe with studs, or the like may be adopted.

The plate fins 84 are provided to project to a space around a fuel gas pipe 87 through which the fuel gas is caused to pass. One end of the fuel gas pipe 87 projects to the outside of the casing 81 and is connected to a not-shown fuel supply path. The other end of the fuel gas pipe 87 also projects to the outside of the casing 81 and is connected to the combustor 12 of the gas turbine 10.

The fuel gas flows through the fuel gas pipe 87. Heat of the fuel gas is transmitted to the plate fins 84 via the fuel gas pipe 87. On the other hand, the compressed air cooled by the heat transfer pipe bundle 83 comes into contact with the plate fins 84 in the shroud 82. At this point, heat exchange is performed. Consequently, the fuel gas is heated and the compressed air is cooled.

Such plate fins 84 are located on the downstream side in the flowing direction of the compressed air with respect to the heat transfer pipe bundle 83. Therefore, the compressed air cooled by the heat exchange with the high-pressure feed water in the heat transfer pipe bundle 83 is further cooled by heat exchange with the fuel gas in the plate fins 84.

The compressed air sequentially passed through the heat transfer pipe bundle 83 and the plate fins 84 reverses the direction of the flow on the lower end side of the shroud 82 and flows into the outer channel 89. The compressed air flown into the outer channel 89 is supplied to the turbine 13 through the exhaust duct 82b and the air channel 61.

A current plate 90 for straightening the compressed air blowing out from the lower end of the shroud 82 is provided on the inner side of the casing 81. A drain pipe 92 for discharging condensate generated in the inside of the casing 81 is provided in the bottom section of the casing 81. A gas leak detector 94 is provided in the casing 81. The gas leak detector 94 is provided in an upper part or a lower part according to the specific gravity of the fuel gas.

Subsequently, a method of actuating the combined cycle electric power generation plant configured as explained above is explained.

First, the main shaft 2 is rotated to drive the gas turbine 10 and the condensing pump 62 is driven to start water supply from the condenser 60 to the high-pressure, intermediate-pressure, and low-pressure drums 34, 35, and 36 of the heat recovery steam generator 30.

The gas turbine 10 is driven and the temperature of the air (exhaust gas) flowing in the inside of the heat recovery steam generator 30 rises, whereby steam is generated in the high-pressure, intermediate-pressure, and low-pressure evaporators 31, 32, and 33 respectively annexed to the high-pressure, intermediate-pressure, and low-pressure drums 34, 35, and 36.

The high-pressure steam generated in the high-pressure evaporator 31 is pushed out from the high-pressure drum 34 and, after being overheated in the primary and secondary high-pressure superheaters 43a and 43b, supplied to the high-pressure turbine 23.

The intermediate-pressure steam generated in the intermediate-pressure evaporator 32 is pushed out from the intermediate-pressure drum 35 and, after being overheated in the intermediate-pressure superheater 41, reheated in the primary and secondary reheaters 44a and 44b together with the steam returned to the heat recovery steam generator 30 through the high-pressure turbine 23. The intermediate-pressure steam reheated in the primary and secondary reheaters 44a and 44b is supplied to the intermediate-pressure turbine 22.

The low-pressure steam generated in the low-pressure evaporator 33 is pushed out from the low-pressure drum 36, overheated in the low-pressure superheater 40, and supplied to the low-pressure turbine 21.

When the gas turbine 10 is driven, work applied to the turbine 13 by the combustion gas is extracted as rotating force of the main shaft 2. When the high-pressure steam is supplied to the high-pressure turbine 23, work applied to the high-pressure turbine 23 by the high-pressure steam is extracted as rotating force of the main shaft 2. When the intermediate-pressure steam is supplied to the intermediate-pressure turbine 22, work applied to the intermediate-pressure turbine 22 by the intermediate-pressure steam is extracted as rotating force of the main shaft 2. When the low-pressure steam is supplied to the low-pressure turbine 21, work applied to the low-pressure turbine 21 by the low-pressure steam is extracted as rotating force of the main shaft 2. Consequently, the generator 1 connected to the main shaft 2 is driven and electric power generation is started.

During steady operation of the combined cycle electric power generation plant, the cooling air cooler 71 causes the high-pressure feed water supplied to the high-pressure drum 34 and the compressed air extracted from the compressor 11 to perform heat exchange to heat the high-pressure feed water to thereby cool the compressed air. The fuel gas heater 72 causes the compressed air cooled by the cooling air cooler 71 and the fuel gas to perform heat exchange to further cool the compressed air to thereby heat the fuel gas.

The integral heat exchanger 80 causes the high-pressure feed water circulating in the inside of the heat transfer pipes and the compressed air circulating in the inside of the shroud 82 to perform heat exchange to heat the high-pressure feed water to thereby cool the compressed air. The integral heat exchanger 80 causes the compressed air passed through the heat transfer pipe bundle 83 and the fuel gas circulating in the inside of the fuel gas pipe 87 to perform heat exchange to further cool the compressed air.

With the combined cycle electric power generation plant, the cooling air is cooled stepwise by the cooling air cooler 71 and the fuel gas heater 72. Therefore, work applied to the cooling air by the high-pressure feed water in the cooling air cooler 71 is smaller than that in the past. Moreover, since an average temperature difference between the cooling air cooler 71 and the fuel gas heater 72 can be set large, a heat transfer area in the heat exchanges may be small. As a result, it is possible to reduce the cooling air cooler 71 in size.

Figure 6:
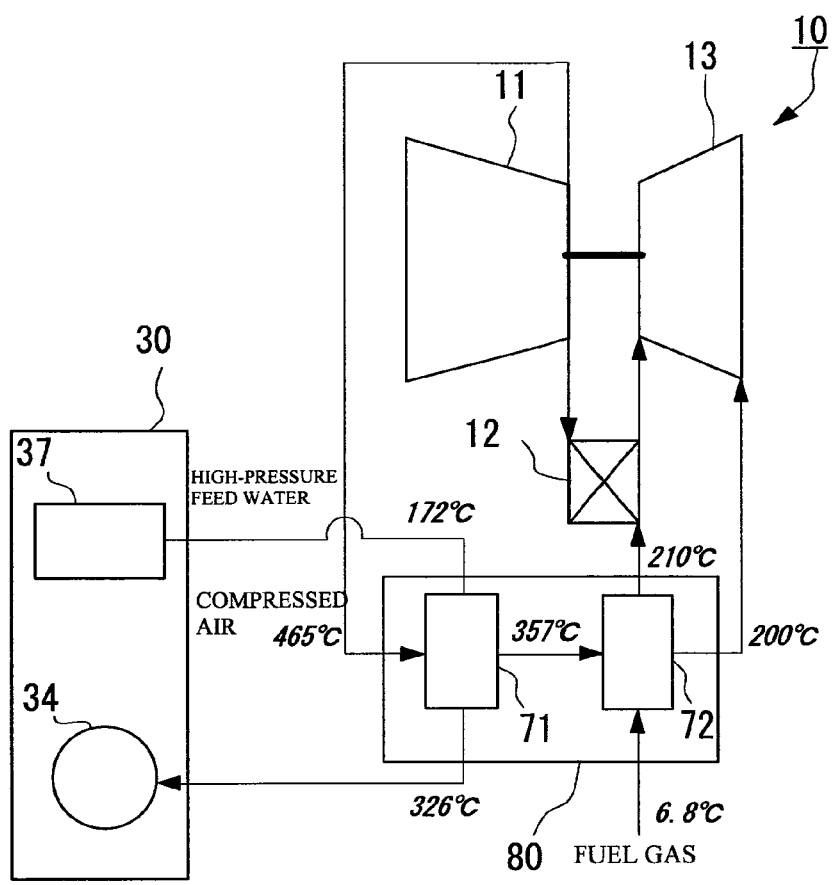
FIG. 6 is an explanatory diagram for explaining heat balance in a cooling air cooler and a fuel gas heater included in the combined cycle electric power generation plant of the present invention.

For comparison with the conventional combined cycle electric power generation plant, an example of heat balance in the cooling air cooler 71 and the fuel gas heater 72 is explained. As shown in FIG. 6, the temperature of the high-pressure feed water supplied from the low-pressure economizer 37 to the cooling air cooler 71 is 172° C. and the temperature of the compressed air supplied from the compressor 11 of the gas turbine 10 to the cooling air cooler 71 is 465° C. The temperature of the high-pressure feed water discharged from the cooling air cooler 71 after heat exchange and supplied to the high-pressure drum 34 is 326° C. and the temperature of the compressed air also discharged from the cooling air cooler 71 after heat exchange is 357° C.

The temperature of the fuel gas supplied to the fuel gas heater 72 is 6.8° C. and the temperature of the compressed air discharged from the cooling air cooler 71 and supplied to the fuel gas heater 72 is 357° C. The temperature of the fuel gas discharged from the fuel gas heater 72 after heat exchange and supplied to the combustor 12 of the gas turbine 10 is 210° C. and the temperature of the compressed air also discharged from the fuel gas heater 72 after heat exchange and served for cooling of the turbine 13 is 200° C.

Figure 7:
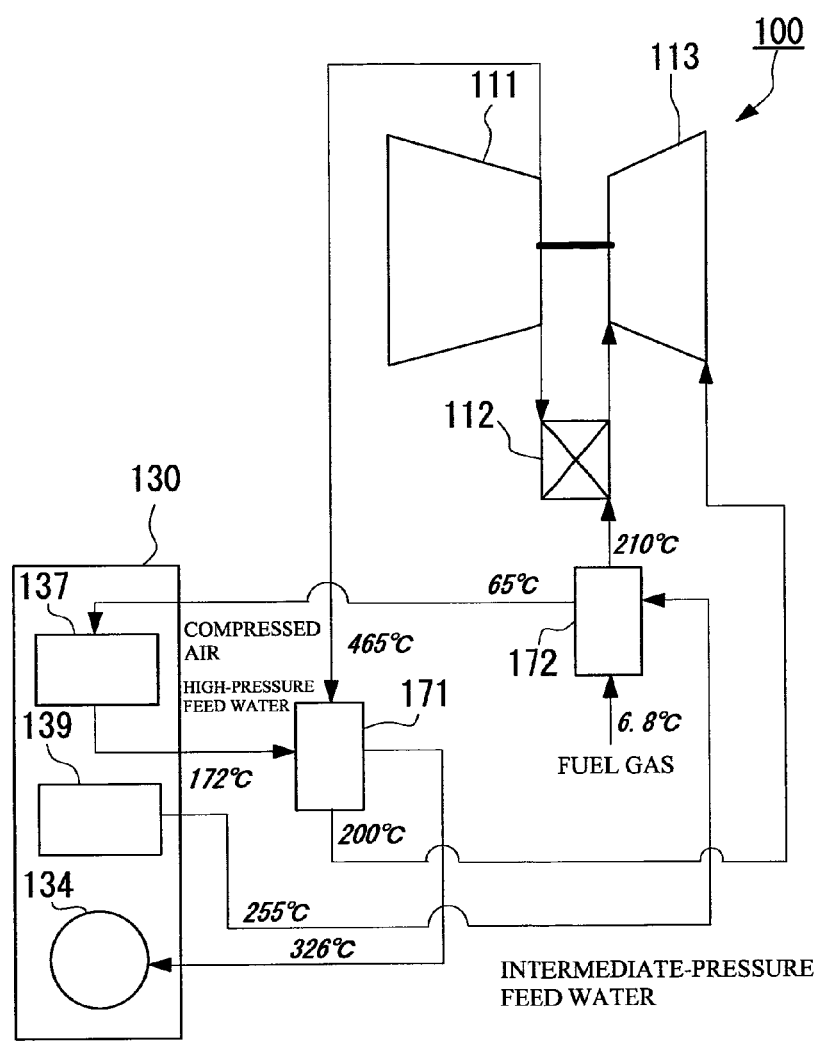
FIG. 7 is an explanatory diagram for explaining heat balance in a cooling air cooler and a fuel gas heater included in a conventional combined cycle electric power generation plant.

In the conventional combined cycle electric power generation plant shown in FIG. 7, the fuel gas heater 172 uses the intermediate-pressure feed water for a heat source for heating the fuel gas (6.8° C. to 210° C.) and causes the fuel gas and the intermediate-pressure feed water to perform heat exchange to deprive heat from the intermediate-pressure feed water (255° C. to 65° C.). Thereafter, the intermediate-pressure feed water is supplied to the high-pressure drum 134 at 65° C. and vaporized by heat of exhaust gas. However, since the intermediate-pressure feed water is cooled in the fuel gas heater 172, a heat quantity of the intermediate-pressure feed water decreases. Therefore, in the heat recovery steam generator, the exhaust gas has to apply excess work to the intermediate-pressure feed water. In other words, in the conventional combined cycle electric power generation plant, an excess heat quantity is necessary for evaporating the intermediate-pressure feed water in the high-pressure drum 134. Therefore, heat that can be recovered in the heat recovery steam generator is wastefully consumed.

On the other hand, in the combined cycle electric power generation plant according to this embodiment, the fuel gas heater 72 uses the compressed air for a heat source for heating the fuel gas (6.8° C. to 210° C.) and causes the fuel gas and the compressed air to perform heat exchange to deprive heat from the compressed air (357° C. to 200° C.). Thereafter, the compressed air is supplied to the turbine 13 at 200° C. and used as a cooling medium for the stationary blade and the moving blades. Heat that can be recovered in the heat recovery steam generator 30 is not consumed. Moreover, since the intermediate-pressure feed water is not used for the heat source of the fuel gas, the intermediate-pressure feed water is supplied to the high-pressure drum 34 while keeping 255° C. Therefore, since a wasteful heat loss in the heat recovery steam generator 30 does not occur, it is possible to improve thermal efficiency of the plant.

In the conventional combined cycle electric power generation plant, the cooling air cooler 171 needs to deprive an extremely large heat quantity from the compressed air (400° C. to 200° C.). Therefore, a heat transfer area of the cooling air cooler 171 has to be increased. As a result, the cooling air cooler 171 is increased in size.

On the other hand, in the combined cycle electric power generation plant according to this embodiment, the cooling air cooler 71 does not need to deprive a heat quantity as large as that in the past from the compressed air (465° C. to 357° C.). Therefore, a heat transfer area of the cooling air cooler 71 may be small. Therefore, it is possible to reduce the cooling air cooler 71 in size.

In this embodiment, the combined cycle electric power generation plant of the single shaft type is explained. However, it goes without saying that the present invention can also be applied not only to the combined cycle electric power generation plant of the single shaft type but also to a combined cycle electric power generation plant of a multi-shaft type.

The invention claimed is:

1. A combined cycle electric power generation plant, comprising:
   a heat recovery steam generator that generates steam for steam turbine driving using heat of exhaust gas of a gas turbine, including an economizer,
   a first heat exchanger that heats high-pressure feed water supplied from the economizer of the heat recovery steam generator by compressed air for turbine cooling extracted from a compressor of the gas turbine to thereby cool the compressed air, and
   a second heat exchanger connected in series with the first heat exchanger along a supply path for the compressed air, and heating a fuel gas for the gas turbine by supplying the compressed air passed through the first heat exchanger to further cool the compressed air to thereby heat the fuel gas.

2. The combined cycle electric power generation plant according to claim 1, further comprising:
   a casing forming an outer shell,
   a shroud arranged in the casing, and
   an inner channel formed in an inner side of the shroud and an outer channel that communicates with the inner channel at one end side of the shroud, formed between the casing and the shroud,
   wherein the first heat exchanger is arranged in the inner channel and the second heat exchanger is arranged in the inner channel further on a downstream side than the first heat exchanger, and
   the compressed air for turbine cooling flows into the inner channel from another end side of the shroud and, after sequentially passing through the first heat exchanger and the second heat exchanger, reverses a direction of the flow from the one end side of the shroud and flows into the outer channel, and is discharged to an outside of the casing from the outer channel.

3. The combined cycle electric power generation plant according to claim 1, wherein the compressed air passed through the first heat exchanger and second heat exchanger is supplied to the economizer.

4. The combined cycle electric power generation plant according to claim 1, wherein the compressed air is cooled stepwise by the first heat exchanger and the second heat exchanger.

5. A heat exchanger for a heat recovery steam generator with an economizer, that generates steam for steam turbine driving using heat of exhaust gas of a gas turbine, the heat exchanger comprising:
   a first heat transfer unit that heats high-pressure feed water supplied from the economizer of the heat recovery steam generator by compressed air for turbine cooling of the gas turbine to heat the high-pressure feed water and to thereby cool the compressed air; and
   a second heat transfer unit connected in series with the first heat transfer unit along a supply path for the compressed air, and heating a fuel gas for the gas turbine by supplying the compressed air passed through the first heat transfer unit to further cool the compressed air to thereby heat the fuel gas.

6. The heat exchanger according to claim 5, further comprising:
a casing that forms an outer shell of the heat exchanger,
a shroud arranged in the casing, and
an inner channel formed in an inner side of the shroud and an outer channel that communicates with the inner channel at one end side of the shroud, formed between the casing and the shroud,
wherein the first heat transfer unit is arranged in the inner channel and the second heat transfer unit is arranged in the inner channel further on a downstream side than the first heat transfer unit, and
the compressed air for turbine cooling flows into the inner channel from another end side of the shroud and, after sequentially passing through the first heat exchanger and the second heat exchanger, reverses a direction of the flow from the one end side of the shroud and flows into the outer channel, and is discharged to an outside of the casing from the outer channel.

7. The heat exchanger according to claim 5, wherein the compressed air is cooled stepwise by the first heat transfer unit and the second heat transfer unit.

\* \* \* \* \*